Patented Dec. 27, 1927.

1,653,850

UNITED STATES PATENT OFFICE.

EARL L. HAUMAN, OF HAMBURG, NEW YORK, ASSIGNOR TO ELECTRO REFRACTORIES CORPORATION, OF BUFFALO, NEW YORK, A CORPORATION OF DELAWARE.

METHOD OF PRODUCING A CARBON-BONDED REFRACTORY.

No Drawing. Application filed April 28, 1926. Serial No. 105,326.

This invention relates to a method of incorporating a carbon-bonded refractory composition with another refractory composition free of carbon and bonded with clay or any combination of oxides.

The use of a carbon-bonded refractory composition as a furnace lining or a crucible is seriously limited owing to the reactive nature of carbon toward certain metals such as nickel or steel. This attack on the bond contaminates the metal and brings about disintegration of the refractory mass and soon destroys the usefulness of the material.

The object of my invention is to provide the carbon-bonded refractory composition with a wearing surface or lining material of any desirable thickness of a non-carbonaceous inert composition, and which shall merge as one with the carbon-bonded refractory composition. It is recognized that the lining material must be so chosen as to coefficients of expansion and contraction that it will lend itself to the incorporative mass forming the body of the structure.

The lining material must possess a high degree of toughness and impermeability under high temperatures and in contact with molten metal. The body material must supply for the most part the mechanical strength and in the case of the crucible, resistance to abrasion and general pit-fire conditions.

In the process of making carbon-bonded articles, it is commonly the practice to depend on coal tar, not only as the source of carbon for the bond, but also as the plastic agent necessary for moulding or shaping the article. It is found possible to choose two widely different mixtures of material but each possessing in the aggregate closely alike coefficients of expansion and contraction, which when prepared in two separate plastic mixtures employing coal tar and pressed or moulded one to the other, can be carbonized into one mass. It is not essential to use coal tar as the source of carbon, many other substances yielding carbon on decomposition being satisfactory, as for example, dextrine, molasses, glucose and the like.

The process of my invention also includes eliminating from the one combination of materials the carbon bond, and making permanent the carbon bond in the other, as hereinafter described.

The uniformly carbonized mass is submerged or treated with borax solution or sodium silicate, over that portion of it in which the carbon bond is intended to be permanent. This treatment is over the entire body material and may also be slightly over the lining portion of the same. It is then fired up to 1600° F. under oxidizing conditions, and held for a time sufficient to burn out the carbon bond of the unprotected portion to a depth which will not reach to the adjoining composition, but only approaching it closely. From this manner of treatment results an incomplete removal of the carbon bond in the merging section or area which varies as to content from no carbon in the lining or wearing portion to the unaffected carbon bond of that portion of the body protected by the borax or fluxing treatment.

The composition of that part of the combined refractory in which the carbon bond is maintained permanently may be any combination of refractory materials adaptable to that manner of bonding, as for example, crystalline graphite, silicon carbide, and a salt. The composition of the other component of the combined refractory is a mixture of bonding clay and highly refractory materials, as for example, mullite, sintered magnesite, zirconium oxide and the like, so chosen as to provide in the aggregate, a coefficient of expansion sufficiently close to the first mentioned component as to withstand heating and cooling without cracking and spalling.

I claim as my invention:

The hereindescribed method of producing a stratified refractory product having a carbon bond in each stratum which consists in eliminating the carbon bond from parts of one stratum and making permanent the carbon bond in parts of the other stratum and incompletely removing the carbon bond in the merging sections or portions of said strata, said merging portions varying from no carbon in the one stratum to the maximum carbon bond in the other stratum.

In testimony whereof I hereby affix my signature.

EARL L. HAUMAN.